US006882998B1

(12) United States Patent
Stemp

(10) Patent No.: US 6,882,998 B1
(45) Date of Patent: Apr. 19, 2005

(54) APPARATUS AND METHOD FOR SELECTING CLUSTER POINTS FOR A CLUSTERING ANALYSIS

(75) Inventor: Iain C. Stemp, Cambridge (GB)

(73) Assignee: Business Objects Americas, San Jose, CA (US)

( * ) Notice: Subject to any disclaimer, the term of this patent is extended or adjusted under 35 U.S.C. 154(b) by 578 days.

(21) Appl. No.: 09/967,806

(22) Filed: Sep. 28, 2001

Related U.S. Application Data

(60) Provisional application No. 60/301,793, filed on Jun. 29, 2001.

(51) Int. Cl.⁷ .............................................. G06F 17/30
(52) U.S. Cl. ............................................ 707/6; 455/562
(58) Field of Search ...................... 707/6, 102; 455/562

(56) References Cited

U.S. PATENT DOCUMENTS

| | | | | | |
|---|---|---|---|---|---|
| 5,619,709 | A | * | 4/1997 | Caid et al. ................... | 715/532 |
| 5,933,818 | A | * | 8/1999 | Kasravi et al. ............... | 706/12 |
| 5,983,224 | A | | 11/1999 | Singh | |
| 6,012,058 | A | | 1/2000 | Fayyad | |
| 6,029,195 | A | * | 2/2000 | Herz .......................... | 725/116 |
| 6,035,057 | A | * | 3/2000 | Hoffman ..................... | 382/159 |
| 6,115,708 | A | * | 9/2000 | Fayyad et al. ................. | 707/6 |
| 6,226,408 | B1 | * | 5/2001 | Sirosh ........................ | 382/224 |
| 6,449,612 | B1 | * | 9/2002 | Bradley et al. ................ | 707/6 |
| 6,523,026 | B1 | * | 2/2003 | Gillis ............................. | 707/3 |
| 6,564,197 | B1 | * | 5/2003 | Sahami et al. ................ | 706/55 |
| 2003/0064754 | A1 | * | 4/2003 | Wilson et al. ............... | 455/562 |

OTHER PUBLICATIONS

Berry et al., *Data Mining Techniques*, pp. 192–207.
Blashfield, "Mixture model tests of cluster analysis: Accuracy of four agglomerative hierarchical methods", *Psychol. Bulletin*, 83:3:377–385 (1976).
Everitt, *Cluster Analysis*, Third edition, Halsted Press, New York (1993).
Friedman et al., "On some invariant criteria for grouping data", *Journal of American Statistical Association*, 62:1169–1178 (1967).
Hartigen, (1975) *Clustering Algorithms*, John Wiley & Sons, New York, pp. 84–112.
MacQeen, "Some methods for classification and analysis of multivariate observations", *Proc. 5ᵗʰ Berkeley Symp.*, 1:281–297 (1967).
Marriott, "Optimization methods of cluster analysis", *Biometrika*, 69:2:417–421 (1982).
McRae, "Micka: A Fortran IV iterative K–means cluster analysis program", *Behavioral Science*, 16:423–424 (1971).
Thorndike, "Who belongs in the family?", *Psychometrika*, 18:4:267–276 (1953).

\* cited by examiner

*Primary Examiner*—Wayne Amsbury
(74) *Attorney, Agent, or Firm*—Cooley Godward LLP

(57) ABSTRACT

A method of clustering data includes choosing an initial cluster point and proximate data points from a set of data points. A revised data set is defined that excludes the initial cluster point and the proximate data points. A cluster point relatively far from the selected cluster point is selected. A revised data set excluding the selected cluster points and proximate data points is then defined. A decision is made whether to choose another cluster point. If so, a cluster point relatively far from the selected cluster points is selected and a revised data set excluding the selected cluster points and corresponding proximate data points is defined. If another cluster point is not to be selected, a final cluster point is chosen within the revised data set. The final cluster point is relatively far from the previously selected cluster points. The selected cluster points are then used to initiate a cluster analysis.

21 Claims, 4 Drawing Sheets

US 6,882,998 B1

APPARATUS AND METHOD FOR SELECTING CLUSTER POINTS FOR A CLUSTERING ANALYSIS

This application claims priority under 35 U.S.C. § 119(e) to U.S. Provisional Application No. 60/301,793, filed Jun. 29, 2001.

BRIEF DESCRIPTION OF THE INVENTION

This invention relates generally to the processing of large volumes of data. More particularly, this invention relates to a technique for efficiently selecting initial clustering points to facilitate the effective clustering of large volumes of data into related groups.

BACKGROUND OF THE INVENTION

As the volume of information in databases grows, there are ongoing efforts to more effectively utilize this voluminous information. On such technique is referred to as clustering or segmentation. A prevalent clustering technique is referred to as the K-Means algorithm. The K-Means algorithm divides a data set into K clusters through an iterative process. The iterative process identifies the best centroids in the data to efficiently select the K clusters.

There are ongoing efforts to improve the computational efficiency of computer implemented K-Means modules. Most of these efforts are directed toward the execution of the K-Means algorithm after an initial set of clustering points has been selected. These approaches ignore an important factor in the overall efficiency of the K-Means technique. That is, the results of a K-Means clustering analysis are frequently dependent upon the choice of initial clustering points for the K clusters. Therefore, a poor selection of clustering points can result in excessive computations and a non-robust solution.

Some techniques rely upon the first K data points as the cluster points or "seeds", other algorithms choose widely spaced records in case the records have a meaningful order, e.g. use record numbers int($i*n/k$), where $i=1, \ldots ,k$ and n is the number of data records. There are drawbacks with both of these methods.

Accordingly, it would be highly desirable to provide an improved technique for clustering data. More particularly, it would be highly desirable to provide an improved clustering analysis through the efficient and intelligent selection of initial clustering points.

SUMMARY OF THE INVENTION

The invention includes a method of clustering data. The method includes choosing an initial cluster point and proximate data points from a set of data points. A revised data set is defined that excludes the initial cluster point and the proximate data points. A cluster point relatively far from the selected cluster point is selected. A revised data set excluding the selected cluster points and proximate data points is then defined. A decision is made whether to choose another cluster point. If so, a cluster point relatively far from the selected cluster points is selected and a revised data set excluding the selected cluster points and corresponding proximate data points is defined. If another cluster point is not to be selected, a final cluster point is chosen within the revised data set. The final cluster point is relatively far from the previously selected cluster points. The selected cluster points are then used to initiate a cluster analysis.

The invention also includes a clustering analysis method. A cluster point from a set of data points is chosen. An additional cluster point from the set of data points that is relatively far from the cluster point is selected. A decision is then made whether to choose another cluster point. If so, an additional cluster point is selected from the set of data points. If an additional cluster point is not to be selected, a final cluster point at a relatively large distance from data points of the set of data points is selected. In particular, the final cluster point is selected in such a way as to insure that the final cluster point is not proximately positioned with respect to a cluster point that is relatively far from the set of data points.

The invention also includes a computer readable medium storing instructions to direct a computer to function in a specified manner. The computer readable medium has a first set of instructions to choose a cluster point from a set of data points. A second set of instructions is used to select an additional cluster point from the set of data points that is relatively far from the cluster point. A third set of instructions decides whether to choose another cluster point. If so, the second set of instructions is re-executed. If another cluster point is not to be chosen, instructions are executed to choose a final cluster point at a relatively large distance from data points of the set of data points. The final cluster point is chosen in such a way as to insure that the final cluster point is not proximately positioned with respect to a cluster point that is relatively far from the set of data points.

The invention also includes a computer readable medium storing instructions to direct a computer to execute a clustering analysis. The computer readable medium includes instructions to choose an initial cluster point and proximate data points from a set of data points. The computer readable medium also includes instructions to define a revised data set that excludes the initial cluster point and the proximate data points. There are also instructions to select from the revised data set a cluster point relatively far from selected cluster points. Additional instructions define a revised data set that excludes selected cluster points and corresponding proximate data points. Further instructions decide whether to choose another cluster point. If so, another cluster point relatively far from selected cluster points is identified and another revised data set excluding selected cluster points and proximate data points is defined. If another cluster point is not to be chosen, instructions are executed to choose a final cluster point within the revised data set that is relatively far from selected cluster points.

The invention facilitates improved clustering analyses through the efficient and intelligent selection of initial clustering points. In accordance with the invention, there is relatively low computational overhead associated with the selection of the initial cluster points. The initial cluster points facilitate reduced iterative operations during the clustering analysis. Accordingly, the clustering analysis can be performed in a relatively short period of time and can result in a more robust solution.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
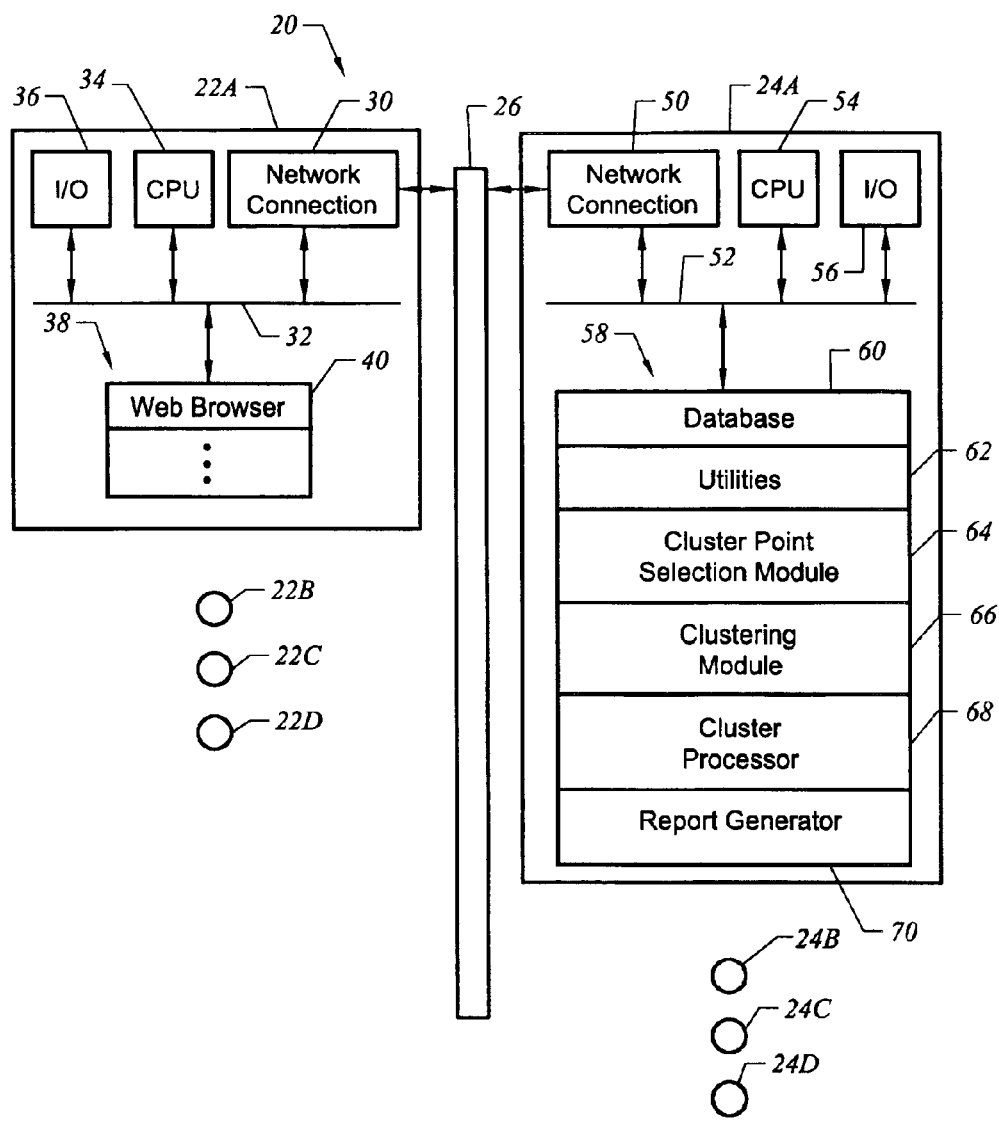
FIG. 1 illustrates a computer network incorporating the techniques of the invention.

FIG. 1 illustrates a computer network 20 implemented to perform the techniques of the invention. The computer network 20 includes a set of client computers 22A–22D and a set of server computer 24A–24D, which are linked by a transmission channel 26, which may be any wired or wireless transmission channel. Each server computer 22 includes a network connection 30 linked between the transmission channel 26 and a system bus 32. A processor (e.g., a central processing unit) 34 is also connected to the system bus 32. A set of input/output devices 36 is also connected to the system bus 32. By way of example, the set of input/output devices 36 may include a keyboard, mouse, display, printer, and the like. A memory 38 is also connected to the system bus. The memory 38 may be primary and/or secondary memory. The memory 38 stores a set of programs including a browser 40 or similar program to access and display information.

Each server computer 24 includes a network connection 50 positioned between the transmission channel 26 and a system bus 52. A processor 54 is also connected to the system bus 52, as is a set of input/output devices 56. A memory 58 is also connected to the system bus 52. The memory 58 stores data and programs including a database 60 and database utilities 62, which are used to access and manipulate the data in the database 60. The memory 58 also stores a cluster point selection module 64. The cluster point selection module 64 implements techniques of the invention. In particular, the cluster point selection module 64 selects a set of cluster points from a set of data, as discussed below. After the cluster point selection module 64 selects cluster points, a clustering module 66 performs a clustering analysis on the set of data. Standard techniques may be used to perform the clustering analysis. For example, the clustering module 66 may perform a standard K-Means clustering analysis. The cluster module 66 produces clustered data. A cluster processor 68 may then process the clustered data. By way of example, the cluster processor 68 coordinates the display of the clustered data, coordinates the printing of the clustered data, and/or updates database records with the clustered data. A report generator 70 may be used to incorporate the clustered data into a report.

A client computer 22 may use standard techniques to access and retrieve the clustered data. Alternately, the clustered data may be accessed and retrieved at a server computer 24.

Many of the components of FIG. 1 are known in the art. The invention is directed toward the cluster point selection module 64, which operates in connection with these known components or other components. The cluster point selection module 64 may be incorporated into a client computer 22. The configuration of FIG. 1 is shown by way of example. Accordingly, it will be appreciated by those skilled in the art that the cluster point selection module 64 may be used in any number of standalone and networked configurations.

Figure 2:
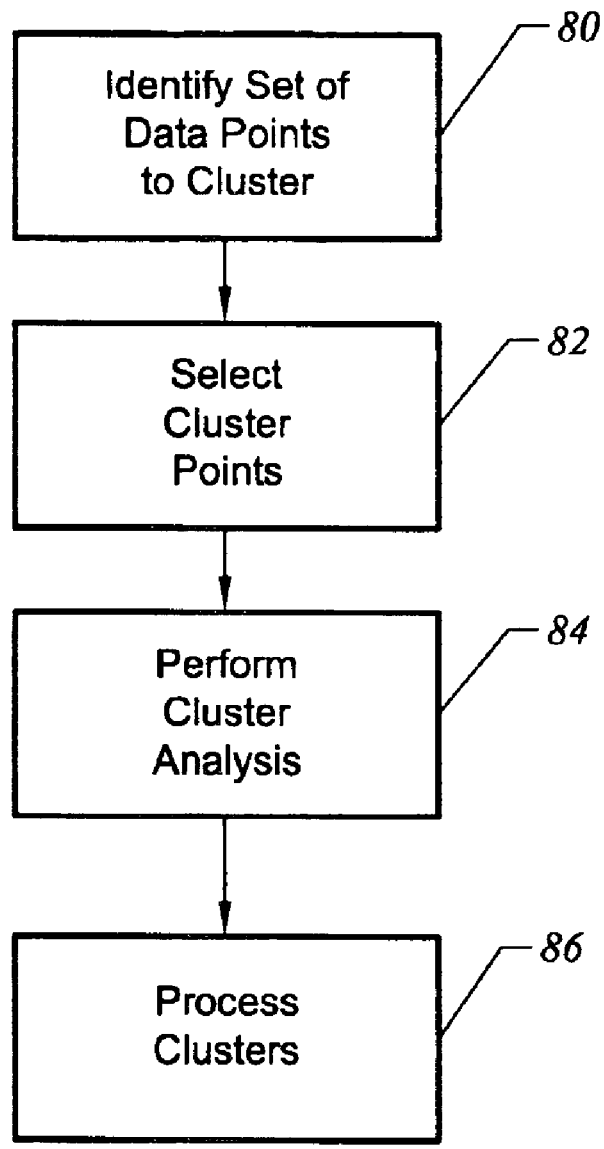
FIG. 2 illustrates a cluster analysis performed in accordance with an embodiment of the invention.

FIG. 2 illustrates a cluster point analysis performed in accordance with an embodiment of the invention. Initially, data points to be clustered are identified (block 80). Thus, for example, utilities 62 may be used to isolate a set of data in the database 60 for clustering. Cluster points are then selected (block 82). The cluster point selection module 64 of the invention may be used in this operation. After an initial set of cluster points is selected, a cluster analysis is performed (block 84). As previously indicated, a standard K-Means cluster analysis may be performed in accordance with the invention. The cluster analysis produces a set of clusters. The clusters may then be processed (block 86) using any number of conventional techniques. For example, the clusters may be processed by displaying or printing them on an output device 56 of the server 24 or at an output device 36 of a client 22. The clusters may also be processed in such a manner as to update records in the database 60. In addition, the clusters may be incorporated into a report by, for example, using the report generator 70.

The context in which the cluster point selection module 64 operates should now be fully appreciated. Attention therefore turns to a more particularized discussion of the cluster point selection module 64. The cluster point selection module 64 includes executable computer instructions used to implement the cluster point selection technique described herein. The executable computer instructions may be standalone instructions or they may; be integrated into a clustering module 66 or other set of computer code.

Figure 3:
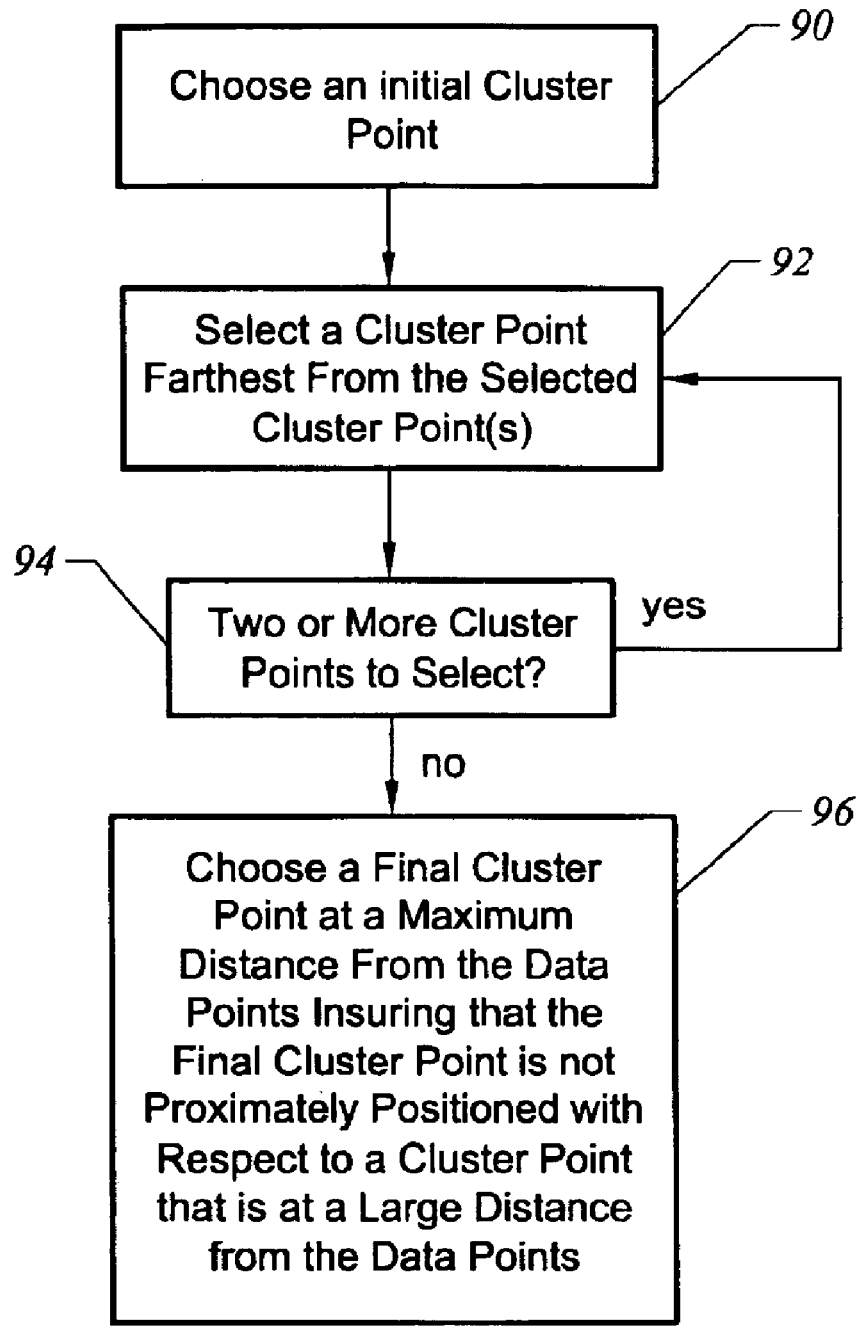
FIG. 3 illustrates a cluster point selection process performed in accordance with an embodiment of the invention.

FIG. 3 illustrates processing steps associated with one implementation of the cluster point selection module 64 of the invention. The first processing step of FIG. 3 is to choose an initial cluster point (block 90). The initial cluster point may be selected in a random manner in order to simplify processing. Next, a cluster point relatively far from the initial cluster point is selected (block 92). The relatively far cluster point may be the data point that is farthest from the initial cluster point.

If there are two or more cluster points still to be selected (block 94), then another cluster point is selected (block 92). Otherwise, a final cluster point is selected at a relatively large distance (e.g., the maximum distance) from the data points (block 96). This final cluster point is selected in such a manner that the final cluster point is not proximately positioned with respect to a cluster point that is at a large distance from the data points. This condition avoids the selection of two cluster points that are very dissimilar to all other data points.

The foregoing verbal description of an embodiment of the cluster point selection technique of the invention can be characterized mathematically. Suppose that the data for the n objects to cluster are available the form of a matrix, X, such that:

$$X = (x_1\ x_2\ \ldots\ x_n)^T = \begin{bmatrix} x_{11} & x_{12} & \ldots & x_{1p} \\ x_{21} & x_{22} & \ldots & x_{2p} \\ \vdots & & & \vdots \\ x_{n1} & x_{n2} & \ldots & x_{np} \end{bmatrix}$$

Suppose that the distance measure is the Euclidean distance measure between object i and object j:

$$d(i,\ j) = \sum_{k=1}^{p} (x_{ik} - x_{jk})^2$$

The cluster point selection module 64 chooses k initial seeds for clustering. As previously indicated, the first seed can be chosen at random from the n data objects. Alternately, wlog can be chosen as the first object. In either embodiment, this operation corresponds to block 90 of FIG. 3.

A second cluster point farthest from the selected cluster point is then selected (block 92). This can be expressed mathematically as follows:

$$\text{Choose } c_2,\ 1 \le c_2 \le n,\ c_2 \ne c_1 s \cdot t \cdot d(c_1, c_2) = \max_{1 \le j \le n, j \ne c_1} (d(c_1, j))$$

A final cluster point at a maximum distance from the remaining data points is then chosen, so long as that cluster point is not proximately positioned with respect to a cluster point that is at a large distance from the data points (block 69). Mathematically, this can be expressed as:

Choose $c_q$, for $3 \leq q \leq k$, where $c_q$ is chosen such that $$\sum_{i=1}^{q-1} d(c_i, c_q)$$

is maximised for $1 \leq c_q \leq n, c_q \neq c_1, \ldots, c_{q-1}$ with the proviso that $d(c_{s-1}, c_q)$ is not less than the lower quartile of the following data series: $[d(c_{s-1},1), d(c_{s-1},2), \ldots, d(c_{s-1},n)]$, for $s=1, \ldots, q$. If this condition is not satisfied, then $c$, is chosen without being subject to that proviso. As previously indicated, this proviso avoids the choice of two cluster points that are very similar and that are both very dissimilar to all the other objects of the data set.

Figure 4:
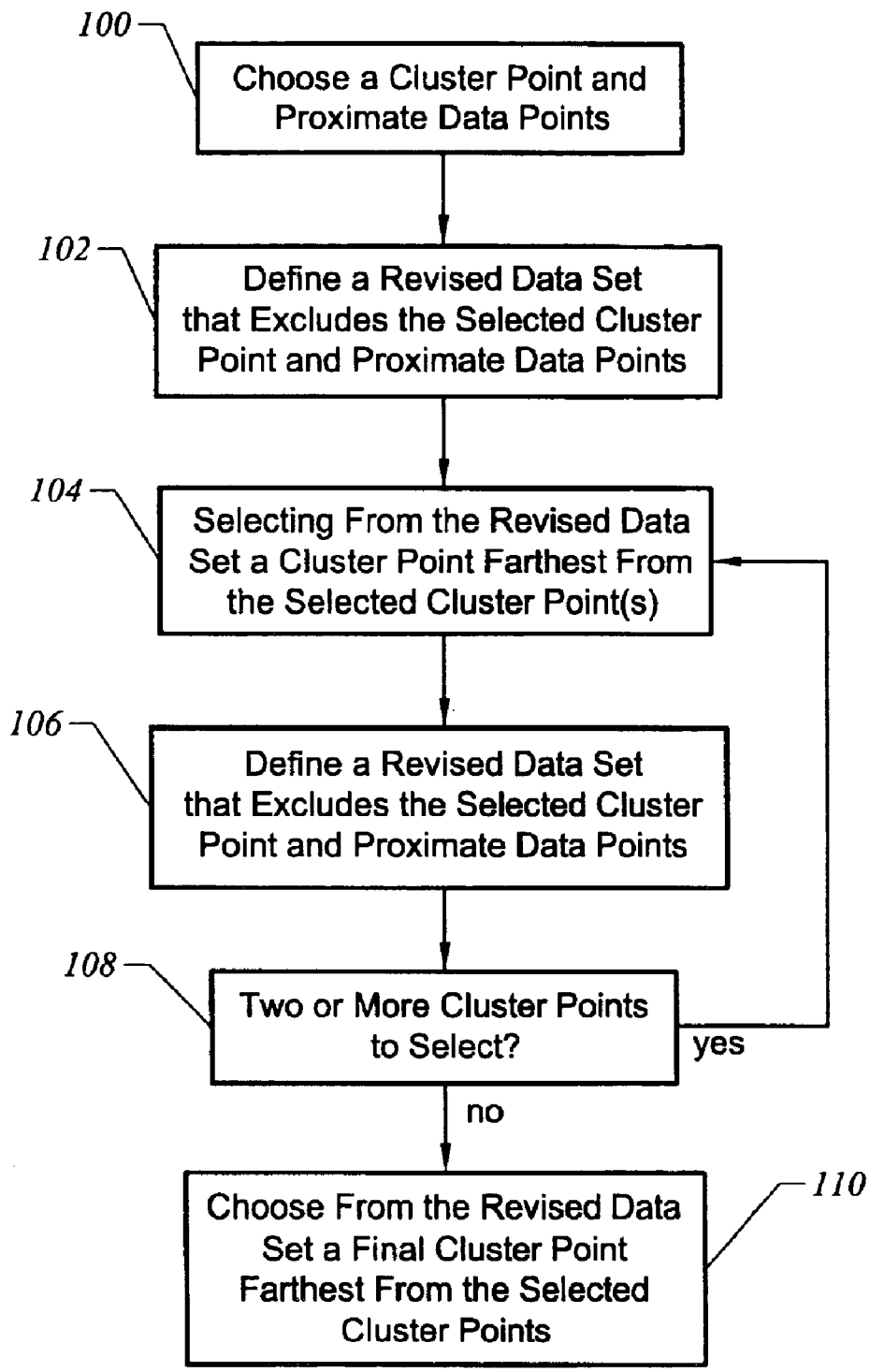
FIG. 4 illustrates a cluster point selection process performed in accordance with an alternate embodiment of the invention.

The technique of the invention can alternately be characterized as shown; in FIG. 4. The first operation of FIG. 4 is to choose an initial cluster point from a data set and then proximate data points to the selected initial cluster point (block 100). The initial cluster point may be chosen randomly. The proximate data points may be the set of data points that are within a predetermined percentage (e.g., 25%) of closest data points in the set of all data points. In this example, the distance between the initial cluster point and all other data points can be measured to produce a list of ranked distances. The proximate data points can then be designated as the data points that are closer than a designated rank distance within the list of ranked distances. The data points can also be designated as the closest X data points within the list of ranked distances.

A revised data set is then defined to exclude the selected cluster point and proximate data points (block 102). An additional cluster point is then selected from the revised data set (block 104). Once again, a revised data set is defined to exclude the selected cluster point and proximate data points. If two or more cluster points still need to be selected (block 108), then the acts of blocks 104 and 106 are performed once again. Otherwise, a final cluster point is selected from the revised data based upon its distance from the selected cluster points (block 110).

These operations are more fully appreciated in connection with a specific example.

Consider the data set of Table I.

TABLE I

| Data Address | Data Value |
| --- | --- |
| 1 | 1 |
| 2 | 2 |
| 3 | 3 |
| 4 | 7 |
| 5 | 8 |
| 6 | 9 |
| 7 | 10 |
| 8 | 32 |
| 9 | 33 |
| 10 | 34 |
| 11 | 37 |
| 12 | 68 |
| 13 | 70 |
| 14 | 71 |
| 15 | 72 |
| 16 | 74 |
| 17 | 75 |
| 18 | 78 |
| 19 | 78 |
| 20 | 80 |

Suppose that four clusters are required. Therefore, four cluster points are to be selected. Suppose that address 10 is selected at random, i.e., the first cluster point is $c_1=10=34$. That is, $c_1$ is address 10, which has a data value of 34. Now, if the difference between the data value at the initial cluster point is compared to the data value at every other address, the following list of ranked values is created:

[$d(c_1,1), d(c_1,2), \ldots, d(c_1,n)$]=[33,32,31,27,26,25,24,2,1,0,3,34,36, 37,38,40,41,44,44,46].

The first entry in the list represents the difference between the value at address one (i.e., 1) and the value at address ten (i.e., 34); that is, 34−1=33. The second entry in the list represents the difference between the value at address two (i.e., 2) and the value at address ten (i.e., 34) that is, 34−2=32. As shown, this produces a list of distances from the initial cluster point. As shown, in the list, the closest data points are at address 8 (i.e., a value of 2), address 9 (i.e., a value of 1), .and address 11 (i.e., a value of 3). Thus, the initial cluster point and this lower quartile of all data points can be defined as a revised data set (block 102). In other words, the initial cluster point $x_{10}$ and its proximate cluster points $x_8, x_9, x_{11}$ can now be excluded from becoming cluster points.

Using this revised data set, a cluster point that is relatively far from the initial cluster is selected (block 104). Relying upon the previous example, the greatest distance from the address value of 10 (i.e., data value of 34) is at address value 20 (i.e., data value 80). Therefore, the second cluster point is at address 20. In other words, $c_{2=20}$, since $x_{c_2}=x_{20=80}$ is furthest away from $x_{c_1}=x_{10=34}$. A revised data set is then defined to exclude the selected cluster point and its proximate data points (block 106). Once again, taking the difference in the value between the cluster point and the remaining values produces a list of distances:

[$d(c_2,1),d(c_2,2), \ldots, d(c_2,n)$]=[79,78,77,73,72,71, 70,48,47,46,43, 12,10,9,8,6,5,2,2,0]

In this case, the smallest distances are at address 17 (i.e., a value of 5), address 18 (i.e., a value of 2) and address 19 (i.e., a value of 2). Thus, the second cluster point $x_{20}$ and its proximate cluster points $x_{17}, x_{18}, x_{19}$, can be excluded from a refined data set.

Suppose now that another cluster point is to be chosen (block 108—Yes). In this case, the operations of block 104 are repeated. That is, a third cluster point $c_3$ is chosen, namely:

$c_3$ is chosen such that $$\sum_{i=1}^{2} d(c_i, c_3)$$

is maximised for $1 \leq c_3 \leq n, c_3 \neq c_1, c_2$ such that $c_3 \neq 8,9,10,11, 17,18,19,20$, since these objects or addresses have either been used as cluster points or have been excluded in view of their proximity to cluster points.

In this case, $c_3=1$ since $d(10,1)+d(20,1)=112$ which is maximum. Therefore, address 1 is chosen as the next cluster point because of its distance from the selected cluster points (block 104). A revised data set is then defined (block 106). As done before, the distance between the new cluster point and the remaining cluster points is measured to produce a list:

[$d(c_3,1),d(c_3,2), \ldots, d(c_3, n)$]=[0,1,2,6,7,8,9,32,32,33,36,67,69,70, 71,73,74,77,77,79].

This list can be used to identify the fact that addresses $x_2, x_3, x_4$ are most proximate to the newly selected cluster point. Accordingly, the revised data set now excludes $x_1$, $x_2, x_3, x_4$.

Suppose now that a final cluster point needs to be selected (block 108—No). At this juncture, a final cluster point is selected from the revised data set. In particular, the final cluster point is selected as the data point in the revised data set that is farthest from the selected cluster points. In other words, the fourth cluster point, $c_4$ is chosen such that $$\sum_{i=1}^{3} d(c_i, c_4)$$

is maximised for $1 \leq c_4 \leq n, c_4 \neq c_1, c_2, c_3$ such that $c_4 \neq 2,3,4,8,9,10,11,17,18,19,20$ as these objects have either been used as seeds or have been excluded from being seeds. In this example, $c_{4=16}$ since $d(10,16)+d(20,16)+d(1,16)=119$ which is maximum. At this point, the initial seeds have been chosen as the values: 34 (address 10), 80 (address 20), 1 (address 1), and 74 (address 16).

Those skilled in the art will appreciate that the technique of the invention can be implemented with relatively low computational overhead. Thus, the cluster points can be selected rapidly. Despite their rapid selection, the seeds are well distributed within the data set, rendering successful clustering analyses, as discussed below.

In order to assess the performance of the technique of the invention, the results achieved in accordance with the invention can be compared to other methods for determining initial cluster points. In particular, the performance results for the technique of the invention can be compared to a random selection of cluster points and the selection of the first k data points.

In this performance analysis, the same k-Means clustering algorithm was used on each set of selected cluster points. The following results are shown together with a measure of the effectiveness of the clustering. Relying upon the previous one-dimensional problem of clustering people according to their age, the data set is defined as:

X=(1, 2, 3, 7, 8, 9, 10, 32, 33, 34, 37, 68, 70, 71, 72, 74, 75, 78, 78, 80).

As discussed above, the technique of the invention produces cluster points at the values of 34, 80, 1, and 74. Based upon these cluster points, the clustering analysis produces the following groups:

(1,2, 3, 7, 8, 9, 10) (32, 33, 34, 37) (68, 70, 71, 72, 74) (75, 78, 78, 80)

with an Error of Sum Squares (ESS) of 126.2.

A random selection of cluster points and a subsequent clustering analysis produces the following groups:

(1, 2, 3, 7, 8, 9, 10) (32, 33) (34, 37) (68, 70, 71, 72, 74, 75, 78, 78, 80)

with an ESS of 218.4.

Selecting the first k data points and a subsequent clustering analysis produces the following groups:

(1, 2, 3) (7, 8, 9, 10) (32, 33, 34, 37) (68, 70, 71, 72, 74, 75, 78, 78, 80)

with an ESS of 158.0.

The Error Sum of Squares (ESS), equivalent to the within group sum of squares, is a measure of the information loss of a particular clustering, the lower the value the better the grouping.

$$ESS = \sum_{i=1}^{n} d_{i,c(t)}^{2},$$

where $d_{i,c(i)}$ is the Euclidean distance from individual i, to the mean of the cluster to which it is assigned. Accordingly, it can be seen that the technique of the invention results in a clustering that has the lowest information loss.

The foregoing description, for purposes of explanation, used specific nomenclature to provide a through understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, the thereby enable other skilled in the art to best utilize the invention and various embodiments with various modifications as are suited to the particular use contemplated. It is intended that the following claims and their equivalents define the scope of the invention.

What is claimed is:

1. A method of performing a clustering analysis on a computer, comprising:

choosing a cluster point from a set of data points;

selecting an additional cluster point from said set of data points that is one of the farthest from said cluster point;

deciding whether to select two or more cluster points, if so, repeat said selecting, if not, choose a final cluster point that is one of the farthest from said set of data points; and performing a clustering analysis on said set of data points with selected cluster points to form clustered data.

2. The method of claim 1 wherein said choosing said cluster point includes selecting said cluster point randomly from said set of data points.

3. The method of claim 1 further comprising processing said clustered data.

4. The method of claim 3 further comprising processing said clustered data by performing an operation selected from the group including displaying said clustered data, printing said clustered data, updating database records with said clustered data, and incorporating said clustered data into a report.

5. A method of clustering data in a computer, comprising:

choosing an initial cluster point and proximate data points from a set of data points, wherein said proximate data points are within a threshold distance of said initial cluster point;

defining a revised data set that excludes said initial cluster point and said proximate data points;

selecting from said revised data set a cluster point that is one of the farthest from selected cluster points;

defining a revised data set that excludes selected cluster points and corresponding proximate data points; and deciding whether to select two or more cluster points, if so, repeat said selecting, if not, choose a final cluster point within said revised data set that is one of the farthest from selected cluster points.

6. The method of claim 5 wherein choosing said initial cluster point includes choosing said initial cluster point randomly from said set of data points.

7. The method of claim 5 wherein said defining includes:

measuring the distance between said cluster point and data points in said set of data points to produce a list of ranked distances; and designating proximate data points as data points that are closer than a designated rank distance within said list of ranked distances.

8. The method of claim 5 further comprising performing a clustering analysis on said set of data points with selected cluster points to form clustered data.

9. The method of claim 8 further comprising processing said clustered data.

10. The method of claim 9 further comprising processing said clustered data by performing an operation selected from the group including displaying said clustered data, printing said clustered data, updating database records with said clustered data, and incorporating said clustered data into a report.

11. A computer readable medium storing instructions to direct a computer to function in a specified manner, comprising:

a first set of instructions to choose a cluster point from a set of data points;

a second set of instructions to select an additional cluster point from said set of data points that is one of the farthest from said cluster point; and a third set of instructions to decide whether to select two or more cluster points, if so, repeat said second set of instructions, if not, execute instructions to choose a final cluster point that is one of the farthest from data points of said set of data points.

12. The computer readable medium of claim 11 wherein said first set of instructions includes instructions to select said cluster point randomly from said set of data points.

13. The computer readable medium of claim 11 further comprising instructions to perform a clustering analysis on said set of data points with selected cluster points to form clustered data.

14. The computer readable medium of claim 13 further comprising instructions to process said clustered data.

15. The computer readable medium of claim 14 further comprising instructions to process said clustered data by performing an operation selected from the group including displaying said clustered data, printing said clustered data, updating database records with said clustered data, and incorporating said clustered data into a report.

16. A computer readable medium storing instructions to direct a computer to function in a specified manner, comprising:

instructions to choose an initial cluster point and proximate data points from a set of data points, wherein said proximate data points are within a threshold distance of said initial cluster point;

instructions to define a revised data set that excludes said initial cluster point and said proximate data points;

instructions to select from said revised data set a cluster point that is one of the farthest from selected cluster points;

instructions to define a revised data set that excludes selected cluster points and corresponding proximate data points; and instructions to decide whether to select two or more cluster points if so, repeat said instructions to select, if not, execute instructions to choose a final cluster point within said revised data set that is one of the farthest from selected cluster points.

17. The computer readable medium of claim 16 wherein said instructions to choose said initial cluster point include instructions to choose said initial cluster point randomly from said set of data points.

18. The computer readable medium of claim 16 wherein said instructions to define include:

instructions to measure the distance between said cluster point and data points in said set of data points to produce a list of ranked distances; and instructions to designate proximate data points as data points that are closer than a designated rank distance within said list of ranked distances.

19. The computer readable medium of claim 16 further comprising instructions to perform a clustering analysis on said set of data points with selected cluster points to form clustered data.

20. The computer readable medium of claim 19 further comprising instructions to process said clustered data.

21. The computer readable medium of claim 20 further comprising instructions to process said clustered data performing an operation selected from the group including displaying said clustered data, printing said clustered data, updating database records with said clustered data, and incorporating said clustered data into a report.

\* \* \* \* \*